Figure 10:
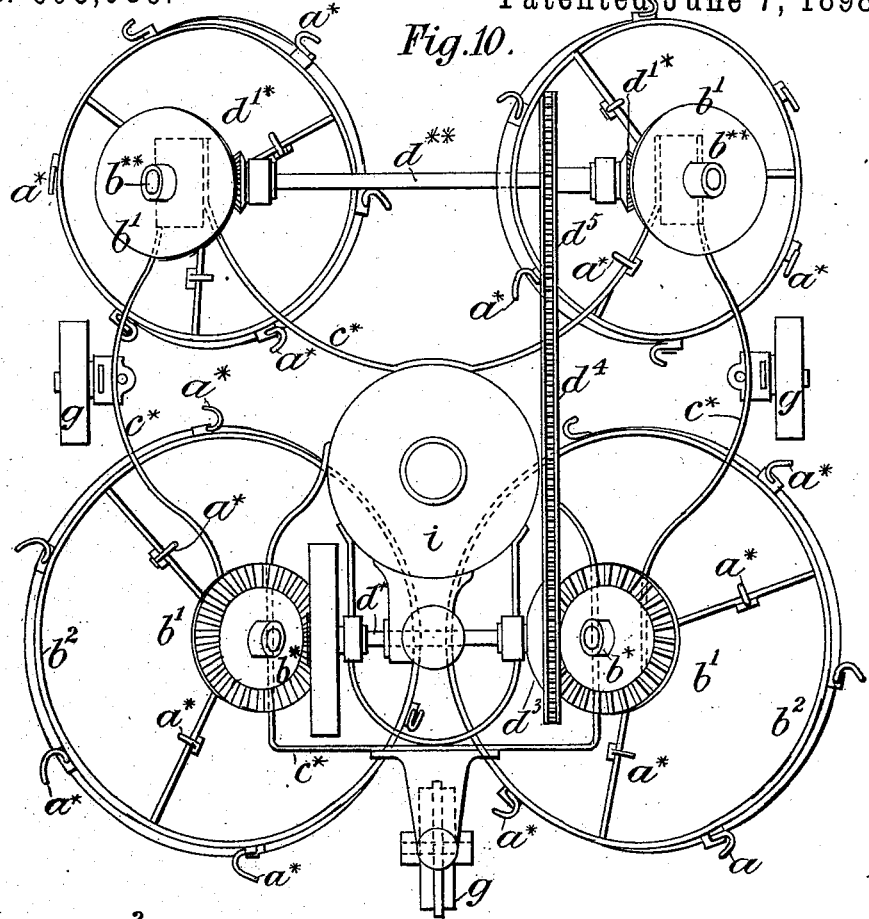

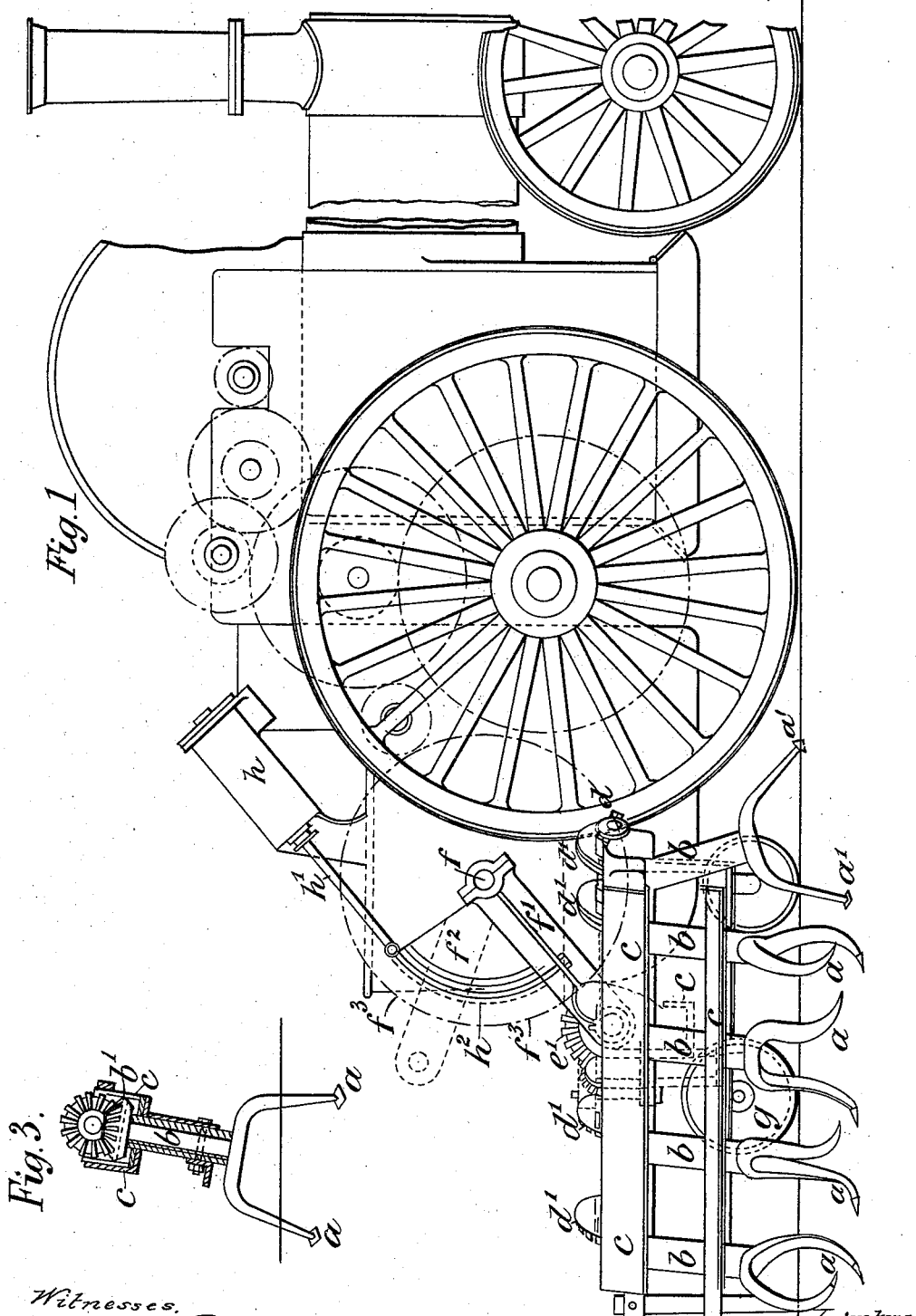

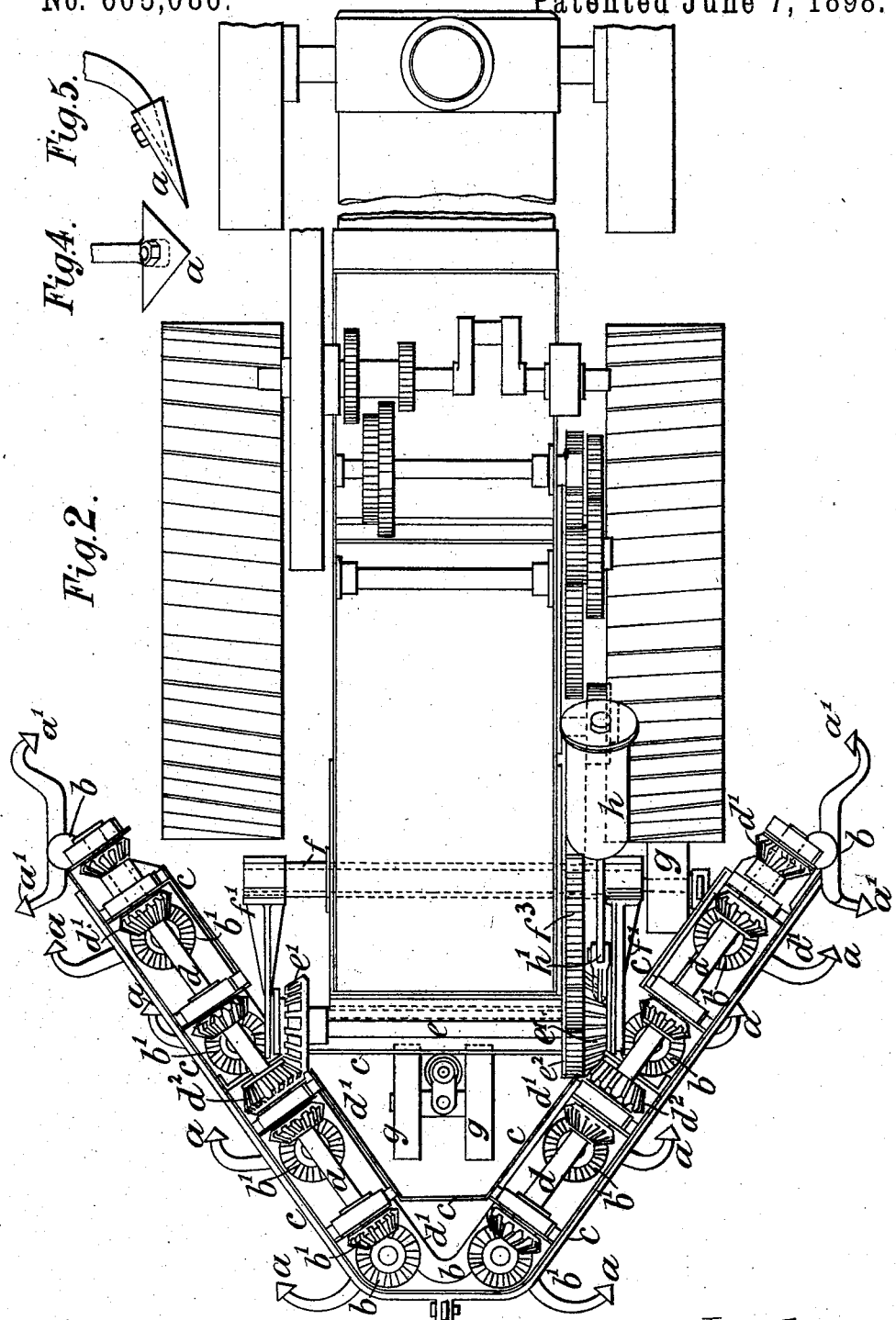

(No Model.) 4 Sheets—Sheet 3.
T. A. & S. C. DARBY.
IMPLEMENT FOR DIGGING OR CULTIVATING LAND.
No. 605,086. Patented June 7, 1898.
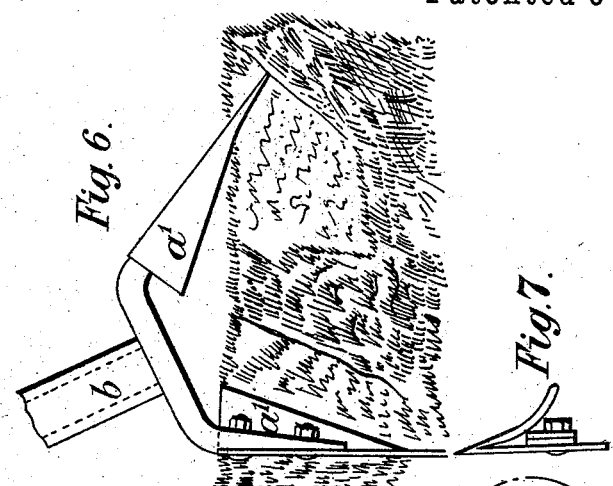
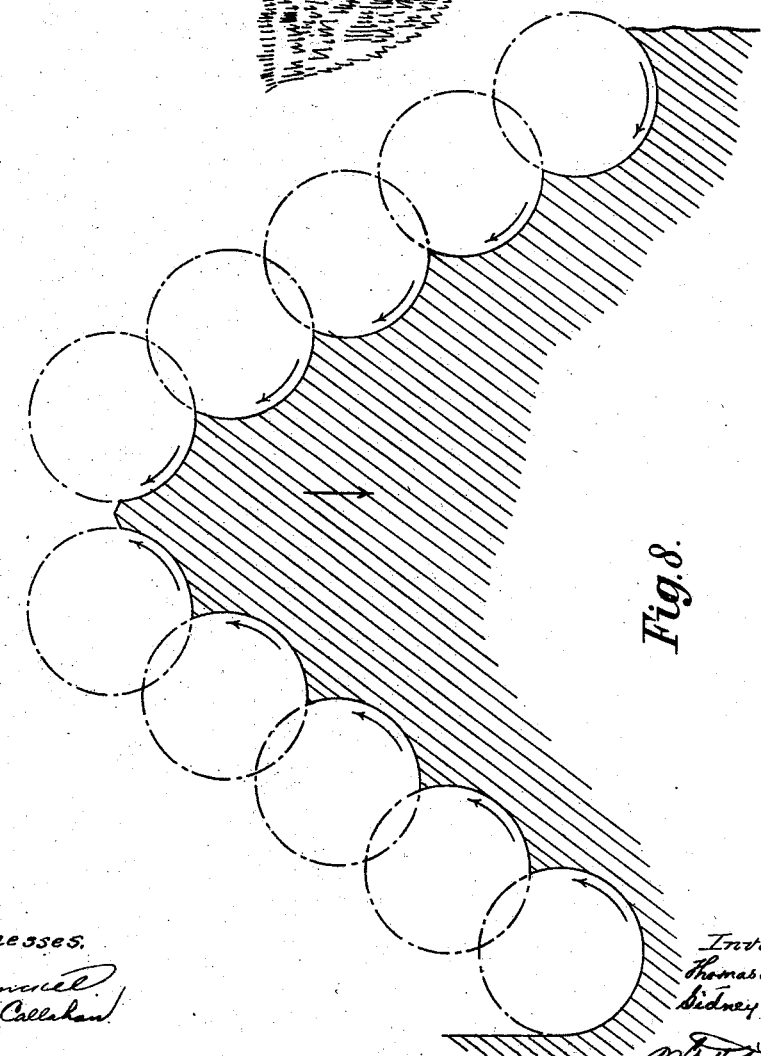
Witnesses.
Inventors
Thomas Albert Darby,
Sidney Charles Darby,
by (No Model.)  4 Sheets—Sheet 4.

T. A. & S. C. DARBY.
IMPLEMENT FOR DIGGING OR CULTIVATING LAND.

No. 605,086. Patented June 7, 1898.

Witnesses:
E. A. Finckel
Nellie Callahan

Inventors,
Thomas Albert Darby
Sidney Charles Darby
by Wm. H. Finckel, Atty.

THE NORRIS PETERS CO., PHOTO-LITHO., WASHINGTON, D. C.

UNITED STATES PATENT OFFICE.

THOMAS A. DARBY AND SIDNEY C. DARBY, OF LONDON, ENGLAND.

IMPLEMENT FOR DIGGING OR CULTIVATING LAND.

SPECIFICATION forming part of Letters Patent No. 605,086, dated June 7, 1898.

Application filed March 11, 1897. Serial No. 626,993. (No model.) Patented in England December 13, 1895, No. 23,928; in France December 11, 1896, No. 262,100; in Belgium December 11, 1896, No. 125,123; in Germany December 12, 1896, No. 93,986; in Hungary February 10, 1897, No. 8,871; in Austria February 28, 1897, No. 47/635; in Canada March 26, 1897, No. 55,433; in Victoria March 29, 1897, No. 14,046, and in New South Wales March 30, 1897, No. 7,374.

*To all whom it may concern:*

Be it known that we, THOMAS ALBERT DARBY and SIDNEY CHARLES DARBY, subjects of the Queen of Great Britain, residing at Pleshey Lodge, Pleshey, London, in the county of Essex, England, have invented certain new and useful Improvements in Implements for Digging or Cultivating Land, (patented in Great Britain December 13, 1895, No. 23,928; in France December 11, 1896, No. 262,100; in Belgium December 11, 1896, No. 125,123; in Austria February 28, 1897, No. 47/635; in Hungary February 10, 1897, No. 8,871; in Germany December 12, 1896, No. 93,986; in Canada March 26, 1897, No. 55,433; in Victoria March 29, 1897, No. 14,046, and in New South Wales March 30, 1897, No. 7,374,) of which the following is a full, clear, and exact description.

The invention has for its object improved arrangements and combinations of parts whereby simplicity of construction, ease of operation, and efficient work are obtained with a minimum of wear and tear.

According to our invention a number of tools are attached to approximately vertical or slightly-inclined shafts and revolve approximately horizontally or at a slight inclination to the horizon around and with such shafts. These tools not only act upon the land as pulverizers, but the very fact of their breaking away the spits of earth and the resistance afforded by the solid ground causes each tool, as it throws the earth backward, to do its part as a propeller of the implement, and in order to give the greatest possible effect to this principle we construct the frame carrying the tools preferably in the shape of a V, so that each diagonal line of tools has practically equal propelling power. Thus the leading tool having removed its alloted quantity of earth the next in succession has a clear course for getting into position and strikes in at a point which instead of retarding the forward movement of the machine continues its cut at that part of the revolution which propels the machine forward, and the remaining tools follow on in like manner, so that there is only very slight impediment to any of the tools by the disintegrated earth from the adjacent tools. These tools may be arranged in pairs, or as many more as may be found practicable, on each vertical spindle and below the frame. By arranging these circular-moving tools in slightly-inclined planes—those on one side of the frame being inclined in contrary direction to those on the other side—the tools are caused after each cut to return light for their next cut. We propose to make one form of this machine to attach behind any suitable traction-engine and to connect the two by radial arms or otherwise, in which case the digging mechanism is arranged to adapt itself to the ground independently of the supporting-wheels of the engine, while at the same time it can by suitable mechanism be lifted clear of the ground for convenience of turning, &c., from the tender of the engine. Another form of the machine is self-contained and worked by its own motor.

Our invention is illustrated in the accompanying drawings, in which—

Figure 9:
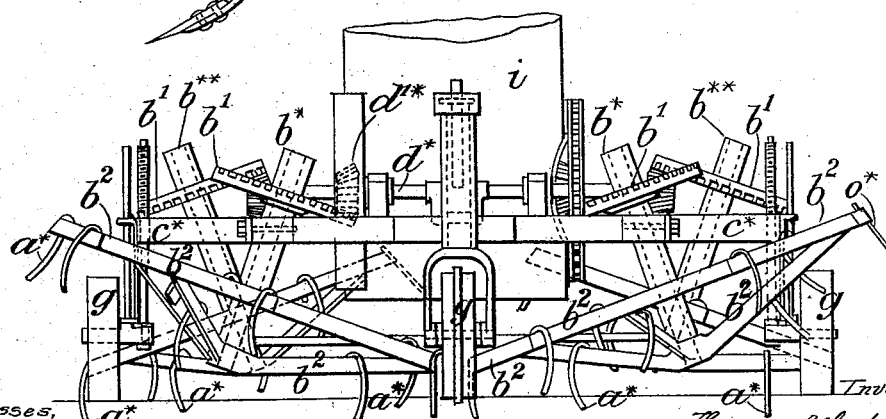

Figure 1 is a side elevation, and Fig. 2 is a plan, of one form of our improved land digging or cultivating implement attached to and worked by a traction-engine; and Fig. 3 is a sectional elevation showing one set of tools with its revolving shaft and operating-gearing. Fig. 4 is a front elevation, and Fig. 5 is a side elevation, of one of the tools represented on Figs. 1 to 3. Fig. 6 is an elevation of a pair of tools of modified construction and the lower end of their shaft $b$ drawn to a larger scale and illustrating their operation on the land. Fig. 7 is a plan of one of said tools, and Fig. 8 is a diagram illustrating the operation of the machine shown by above figures. Fig. 9 is an elevation, and Fig. 10 a plan, of another form of our improved implement, which is self-contained and worked by its own motor; and Fig. 11 is a view of one of the tools used with said implement drawn to a larger scale.

We will first describe the implement and its mode of operation, as illustrated at Figs. 1 to 8.

$a\,a'$ are cultivating-tools, which are carried by the lower ends of shafts $b$, mounted in bearings formed in or fixed to the main framing $c$. This frame is in the form of a V, with its apex toward the rear of the implement. On each of the shafts $b$ is fixed a beveled wheel $b'$, and these wheels $b'$ are driven by bevel-wheels $d'$, fixed on two diagonal shafts $d$, which in their turn are driven by a cross-shaft $e$, on the ends of which are fixed bevel-wheels $e'$, gearing into bevel-wheels $d^2$, fixed one on each shaft $d$.

We prefer to use a traction-engine as a motor, as represented at Figs. 1 and 2. In this case we pass a shaft $f$ through the coal-bunker of the engine, and we fix on each end of said shaft a radius-arm $f'$. The cross-shaft $e$ passes through the outer ends of the radius-arms $f'$, by which means the implement is allowed to rise and fall according to the unevenness of the ground and to run on its own supporting-wheels $g$ $g$ independent of the traction-engine or motor. Motion is communicated from the traction-engine or motor to the cross-shaft $e$ by a toothed wheel $f^3$, fixed on the axis $f$, gearing with a toothed pinion $e^2$ on the cross-shaft $e$.

For facility of turning at the ends of the field or to enable the implement to be moved from place to place we employ a lifting-cylinder $h$, carried by the traction-engine or motor, the piston-rod $h'$ of which is connected by a chain $h^2$ with one of the radius-arms $f'$, said chain $h^2$ passing over a quadrant $f^2$, forming part of said radius-arm, to avoid strain on the piston-rod $h'$. By these means the implement can be lifted clear of the ground and carried bodily by means of the radius-arms $f'$, which are acted upon by the lifting-cylinder $h$, and it can be set down again when required.

By mounting the shafts $b$ at a slight inclination to the perpendicular (see Fig. 3) the cultivating-tools, after they have moved their allotted portion of earth, return with as little resistance as possible for the next cut, the cultivating being done at a lower level than the return stroke. The tools $a$ $a'$ in each row, as clearly shown in Figs. 1 and 2, are arranged at different angles to each other, and by this arrangement the tools in the operation of the machine are caused to act upon the ground one after another, or in succession. We also give to the shafts of the leading tools $a'$ a greater angle than that given to the shafts of tools $a$, as said tools $a'$ have to return over the solid ground, while all the tools $a$ have the work opened for them by the previous cutter. It will also be observed that the corresponding tools of each row are so arranged as to act simultaneously upon the ground and in a rearward direction only—that is to say, in a direction that will tend to push the machine forward, and thereby aid in the propulsion of the implement.

Instead of driving the tools $a$ $a'$ by toothed gearing, as hereinbefore described and as shown in the drawings, they may be driven by cranks and connecting-rods.

Other methods of arranging tools on a V-shaped frame may be adopted.

For deep cultivation we use a tool having the contour substantially as illustrated at Figs. 6 and 7 for throwing the top soil to a greater distance—that is to say, we use a tool which is substantially V-shaped in cross-section and tapers to a penetrating point, so that the lower part of the tool merely acts as a subsoiler, being narrower toward the point, so that at the bottom the soil is merely moved or loosened. For ordinary cultivation we find it preferable to attach flat-footed triangular shares, as shown at Figs. 4 and 5, to lower extremity of the cultivating-tools $a$ $a'$. These shares are easily replaced when worn out. Fig. 8 shows the solid ground, shaded, upon which the train of tools are operating in two lines diagonal to the line of advance. Other mechanism than that shown might be adopted to carry out this principle of causing the cultivating-tools to assist in propelling the implement.

Figure 11:
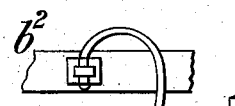

We will now describe the implement represented at Figs. 9, 10, and 11, which is of lighter construction than that above described and designed for surface work when the soil is loose and easily worked. In this modification instead of mounting rigid cutters upon a single inclined shaft $b$ we preferably use spring-tools $a^*$, as shown more clearly at Fig. 11, attached to dish-shaped wheels $b^2$, fixed to inclined shafts $b^*$ $b^{**}$, mounted in suitable bearings carried by the frame $c^*$. The shafts $b^*$ $b^{**}$, and consequently the dish-shaped wheels $b^2$ and tools $a^*$, are driven by bevel-wheels $b'$, fixed on their upper ends, gearing into bevel-wheels $d^*$, fixed to cross-shafts $d^*$ $d^{**}$. The shaft $d^*$ is driven direct from the engine $i$, which is carried by the framing $c^*$, and motion is communicated from the shaft $d^*$ to the shaft $d^{**}$ by chain-wheels $d^3$ $d^5$ and chain $d^4$.

In order that the tools $a^*$ may not travel through the ground in the same direction as the machine travels and thereby prevent the implement from going forward, we arrange the shafts $b^*$ $b^{**}$ inclined to the perpendicular in like manner to the shafts $b$ of the herein first-described arrangement of implement, so that only the tools on that side of the dish wheels which travel in the opposite direction to the machine penetrate the ground. Consequent on the form of the dish wheels $b^2$ the other tools travel above the ground, while those that penetrate the ground propel the implement forward. The implement is carried by three or more wheels $g$, the front one being used as a steering-wheel.

The implement may be constructed with any number of dish-shaped wheels $b^2$; but we find it convenient to employ four, the two front ones being arranged side by side, with their spindles $b^*$ inclined toward each other at their upper ends, so that their tools may cultivate the middle portion of the ground traversed by the machine. The two rear wheels $b^2$ are also arranged side by side, but have their spindles inclined away from each other in order that their tools may cultivate the portions of ground traversed by the machine which were not cultivated by the preceding tools.

According to our invention we are enabled, by varying the tools, to construct a class of machine which is very much needed—viz., a very light implement for surface work, to be operated by motor, substantially as herein described, or by horse-power, the implement being in such latter case provided with suitable supporting and driving wheels, from which motion is communicated to the tools, as will be readily understood.

Having fully described our invention, what we desire to claim and secure by Letters Patent is—

1. In implements for digging or cultivating land, the combination of a suitable supporting-frame, a series of rotating tools mounted upon slightly-inclined shafts and arranged in rows and carried by said frame, the cutting members of said tools in each row being so arranged with relation to each other as to act upon the ground one after another, and gearing connected with said shafts and adapted to rotate them in a direction to cause said tools to act upon the ground in a rearward direction only to aid in propelling the implement forward, substantially as described.

2. In implements for digging or cultivating land, the combination of a V-shaped frame, a series of inclined shafts carried by said frame in diagonal lines or rows, a series of tools carried by said shafts, the cutting members of said tools in each row being so arranged with relation to each other as to act upon the ground one after another in succession, and gearing connected with said shafts and adapted to rotate them in a direction to cause the corresponding tools of each row to act simultaneously upon the ground in a rearward direction to aid in propelling the implement forward, substantially as described.

T. A. DARBY.
S. C. DARBY.

Witnesses:
B. J. B. MILLS,
CLAUDE K. MILLS.